April 10, 1962 E. BROOKS ETAL 3,029,048
HELICOPTER
Filed Sept. 28, 1959 4 Sheets-Sheet 1

Earnest Brooks
John P. Davis
INVENTORS

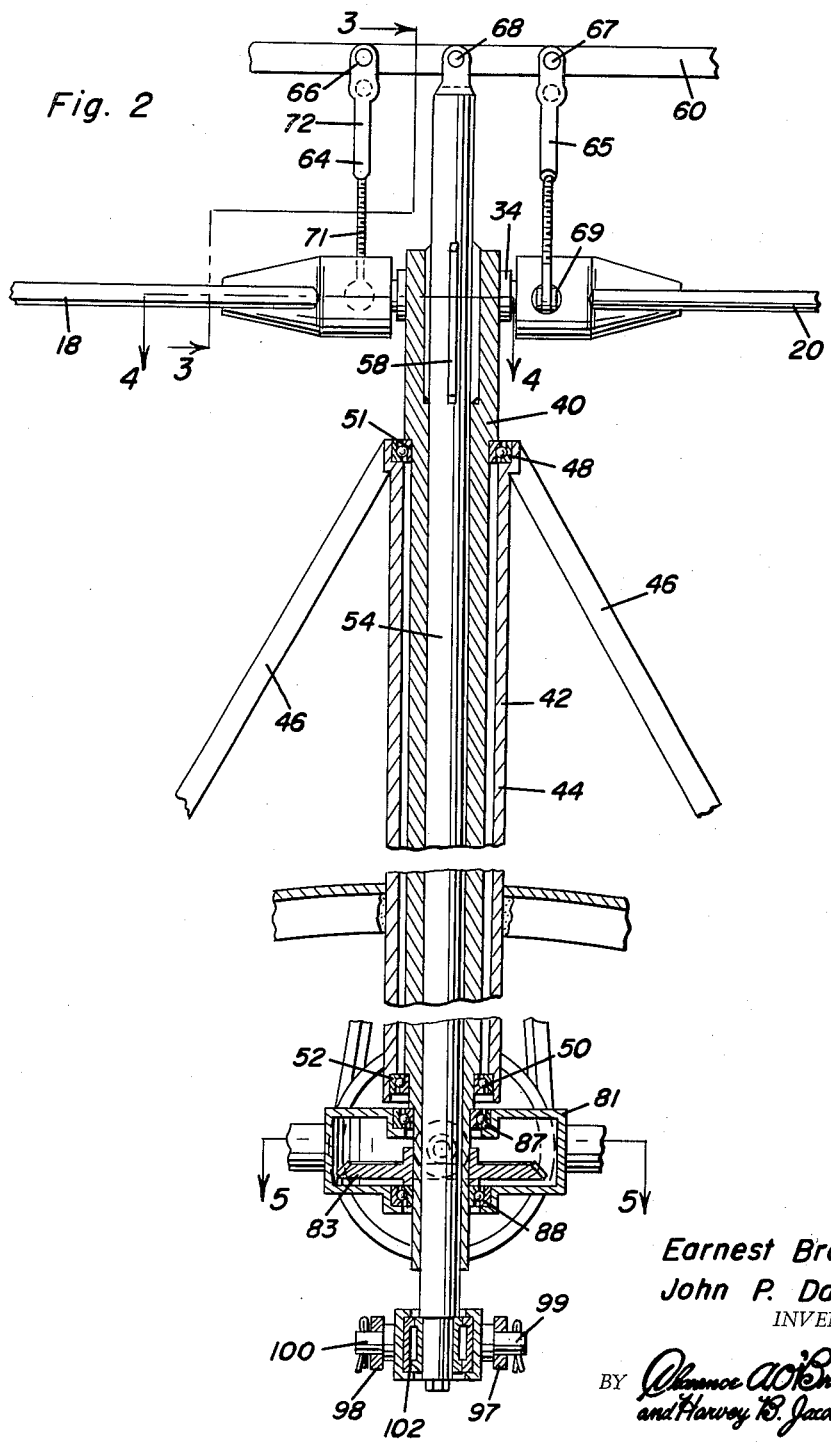

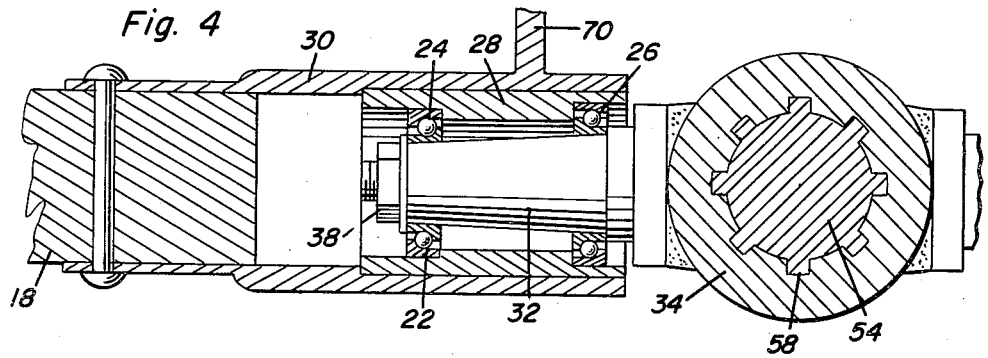
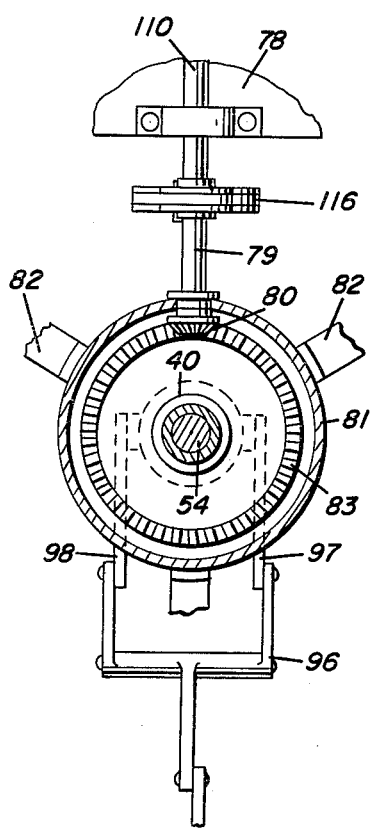
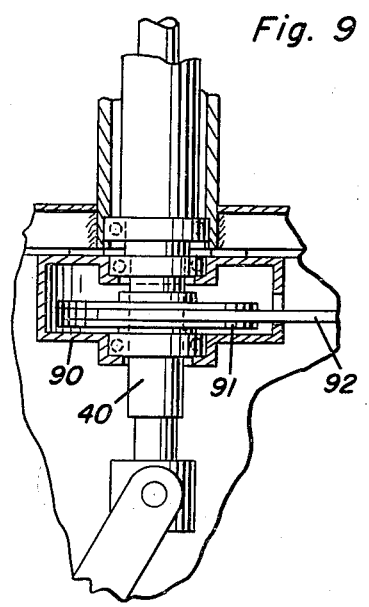
Earnest Brooks
John P. Davis
INVENTOR.

Earnest Brooks
John P. Davis
INVENTORS ic Office
3,029,048
Patented Apr. 10, 1962

3,029,048
HELICOPTER
Earnest Brooks, P.O. Box 61, New Tazewell, Tenn., and
John P. Davis, P.O. Box 97, Tazewell, Tenn.
Filed Sept. 28, 1959, Ser. No. 842,952
9 Claims. (Cl. 244—17.19)

This invention relates to aircraft, and more particularly to helicopters.

An object of the invention is to provide a helicopter with a unique propulsion system including a rotor, together with a propeller providing an air blast over a uniquely arranged empennage.

Briefly, the invention is embodied in a novel helicopter-type aircraft which relies on a new arrangement of control surfaces in the empennage for lateral control or at least a portion thereof, and a rotor which has blades capable of being feathered by the action of an inertia or fly bar operatively connected therewith.

These, together with other objects and advantages which will become subsequently apparent, reside in the details of construction and operation as more fully hereinafter described and claimed, reference being had to the accompanying drawings forming a part hereof, wherein like numerals refer to like parts throughout, and in which:

FIGURE 2 is a vertical sectional view of the rotor of the helicopter type aircraft in FIGURE 1.

FIGURE 4 is a sectional view taken on the line 4—4 of FIGURE 2.

FIGURE 5 is a sectional view on an enlarged scale and taken on the line 5—5 of FIGURE 2.

FIGURE 9 is a fragmentary sectional view showing a modification of the means by which to transmit torque to the rotor.

Figures 1, 3:
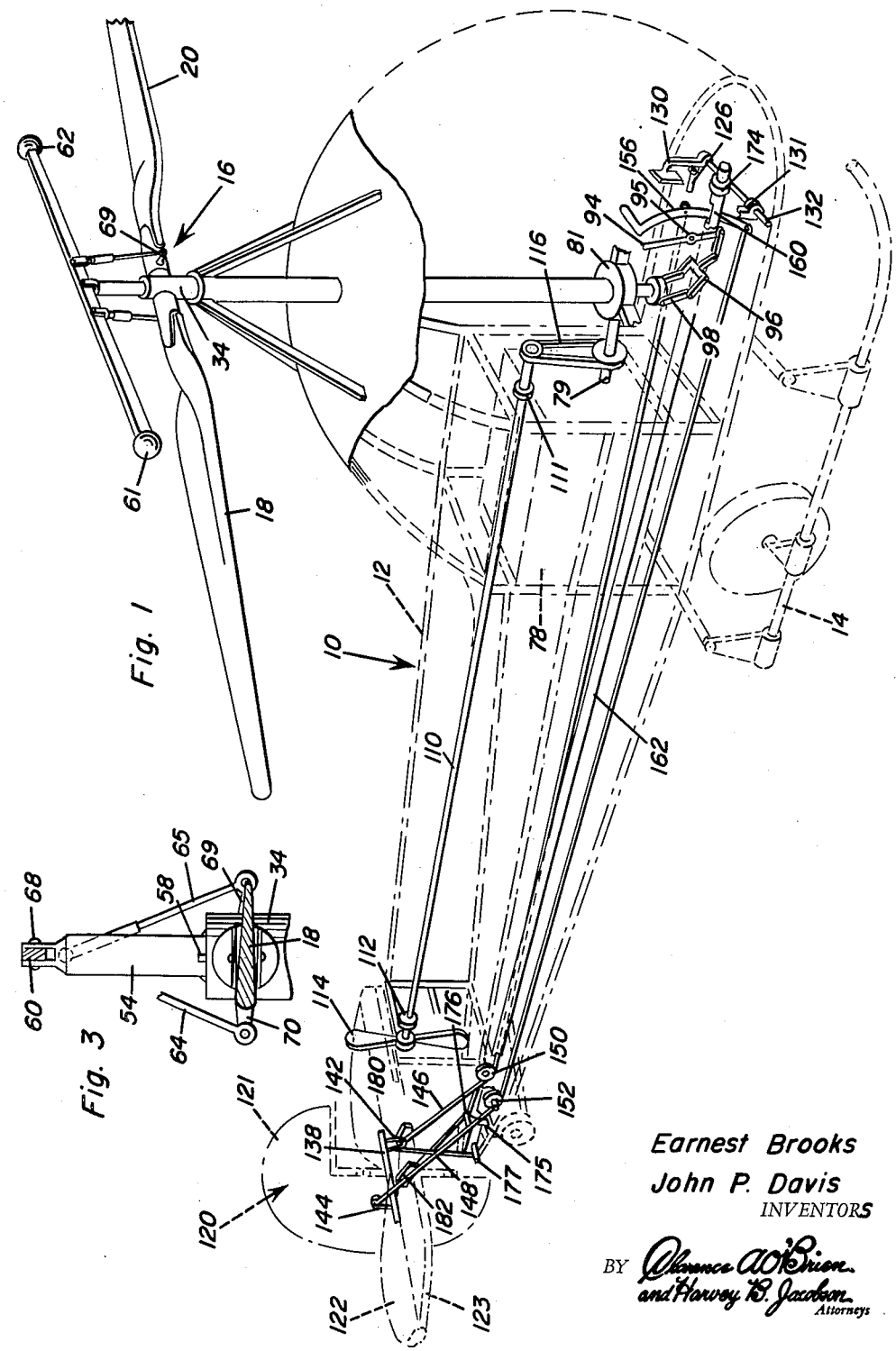
FIGURE 1 is a perspective view showing only a portion of the control assembly for the aircraft, parts of the air frame being shown in dotted lines and parts of the empennage shown in dotted lines so that the rotor and only a portion of the control system which is shown in full lines may be more readily discernible.
FIGURE 3 is a sectional view taken on the line 3—3 of FIGURE 2.

In the accompanying drawings, reference is first made generally to FIGURE 1 and then to FIGURES 2-5 for a description of the rotor and its relationship in the aircraft. The aircraft is a helicopter-type aircraft with the frame 12 arbitrarily selected, i.e., the configuration of the helicopter may be varied. The frame has been chosen as one suitable to support and incorporate the features considered novel in the helicopter. For instance, landing gear 14 is illustrated as being a combination skid-landing wheels, but this may be varied without departing from the novel features to be more fully discussed herein.

Rotor 16 has a pair of blades 18 and 20, each mounted in a bearing such as shown in FIGURE 4 so that the blades are capable of oscillating about the longitudinal axis of each. A typical bearing 22 is made of a pair of anti-friction bearings 24 and 26 mounted in a bearing collar 28 which is attached to the root sleeve 30 of blade 18. Spindle 32 is fixed to hub 34 of the rotor, and it is held fastened by means of nut assembly 38 to the anti-friction bearings 24 and 26.

Hub 34 is fixed to the intermediate hollow shaft 40 of rotor shaft assembly 42 (FIGURE 2), and this is mounted for rotation about an approximately vertical axis established by outer hollow fixed shaft 44. Braces 46 are secured to frame 12 and to the upper part of outer shaft 44 which contains upper and lower anti-friction bearings 48 and 50, respectively. The intermediate shaft 40 has a shoulder 51 and 52 at its upper and lower ends, respectively, engaging the anti-friction bearings 48 and 50 so that the intermediate shaft 40 cannot move axially but is capable of being rotated. The innermost shaft 54 of assembly 42 is coupled to the intermediate shaft 40 by means of key and slot assemblies 58 near the upper end of intermediate shaft 40. Accordingly, innermost shaft 54, which may be either hollow or solid, is rotationally coupled to shaft 40 but is capable of moving axially with reference thereto.

Inertia or fly bar 60 having weights 61 and 62 at the ends thereof is considerably shorter than the rotor blade diameter, and there are two adjustable arms 64 and 65 connected by pivots 66 and 67 to the inertia bar 60 adjacent to the center thereof. The center of the inertia bar is connected by a pivot 68 to the upper extremity of the innermost shaft 54. The lower ends of adjustable arms 64 and 65 are pivotally secured to fixed arms 69 and 70 (FIGURE 3) which protrude laterally from and which are secured to the root sleeves 30 of the two blades 18 and 20. Each arm 64 and 65 is made the same and consists of a screw, for instance, screw 71 for arm 64 threaded into the internally threaded bore of a sleeve 72. This is to enable the effective length of each arm to be adjusted, but once adjusted no further alteration is required.

Engine 78 is only diagrammatically represented (FIGURE 1), and it is carried by and secured to the air frame 12. Principally, the engine is designated by its power output shaft 79 which has a miter gear 80 at the inner end thereof and located within power transfer casing 81 near the lower part of the shaft assembly 72. The power transfer case 81 is fixed by braces 82 that are secured to it and also to a portion of the frame 12. Gear 83 is secured to the lower part of intermediate shaft 40 so that upon operation of the engine, shaft 40 is rotated thereby, causing the shaft 54 to rotate, this being reflected in rotor operation. Power transfer case 80 is used as the structural support for shaft 40, and it is equipped with upper and lower bearings 87 and 88, one of which has shaft 40 shouldered thereon and the other of which provides additional bearing action for the shaft 40.

FIGURE 9 shows a modification of this construction. Here, the power transfer case 90 contains pulley 91 that is fixed to shaft 40, and belt 92 diagrammatically represents a group of such belts whereby the power transmission is obtained through a belt and pulley arrangement as opposed to gearing. It is also possible to use a chain drive because rotational speeds are comparatively low.

In order to obtain the necessary adjustment of the blades during operation of the rotor, control lever 94 (FIGURE 1) is swung on a pivot 95 and is connected with a drive yoke 96 which is also pivoted and which is equipped with a pair of links 97 and 98 pivoted to trunnions 99 and 100 protruding laterally outwardly from bearing assembly 102 that is connected with the lowermost extremity of inner shaft 54. The arrangement is such that forward and rearward movement of lever 94 will cause shaft 54 to move axially and thereby alter the position of the inertia bar 60 and cause different angular displacements of the blades 18 and 20 during each 360° rotational movement thereof.

Counter shaft 110 (FIGURE 1) is mounted for rotation in conveniently supported bearings 111 and 112 on frame 12 and there is a fixed or adjustable pitch propeller 114 at the rear end thereof. The forward end of shaft 110 is driven from the engine shaft 79, for instance, by a chain, belt and pulley transmission 116 or by gearing. The propeller 114 is not only a pusher propeller for the helicopter-type aircraft, but also provides an air stream to make effective the control surfaces of empennage 120 especially during low forward speed flight.

Figure 6:
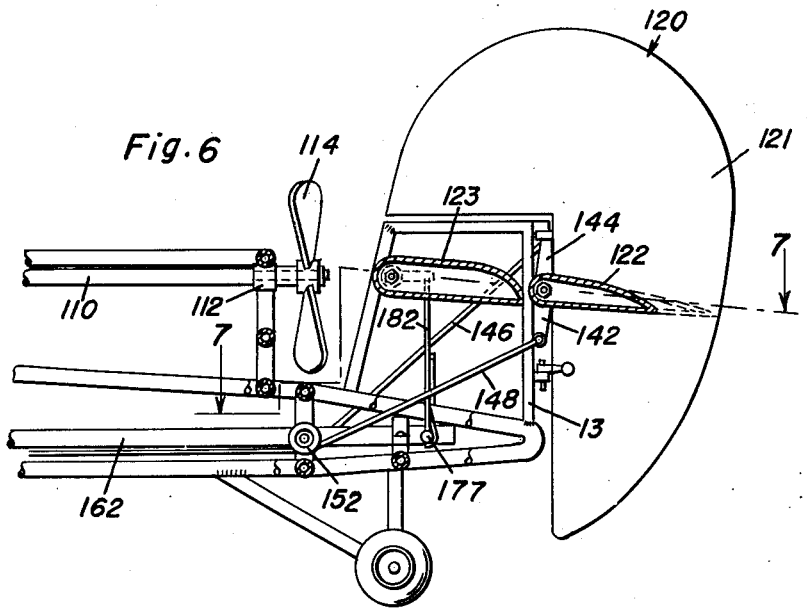
FIGURE 6 is a fragmentary vertical sectional view showing a portion of the empennage.
Figure 7:
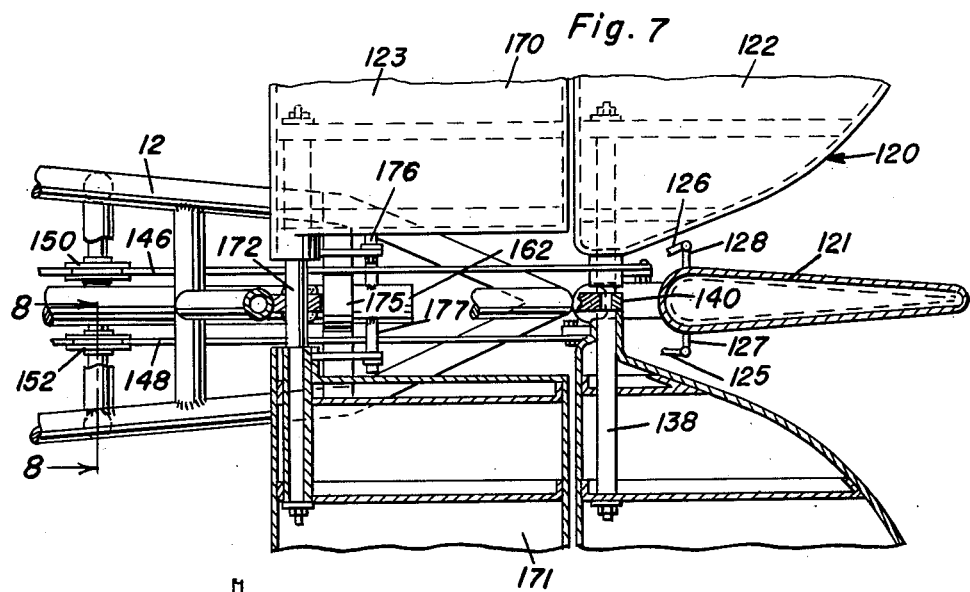
FIGURE 7 is a sectional view taken on the line 7—7 of FIGURE 6.
Figure 8:
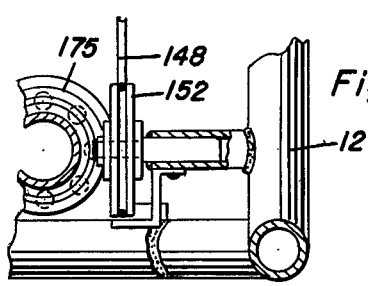
FIGURE 8 is a sectional view taken on the line 8—8 of FIGURE 7.

Empennage 120 has rudder 121, elevator 122 and rearwardly located ailerons 123. The rudder is mounted vertically and is adjustable about a vertical axis established by pins or a vertical shaft coupled to an edge of the rudder and a vertical frame member 13 (FIGURE 6). Adjustment of the rudder is achieved by a pair of cables 125 and 126 (FIGURE 7) attached to horns 127 and 128 protruding laterally outwardly from the rudder at approximately the adjustment axis thereof. These cables extend to pedals 130 and 131 (pedal 131 only partially shown) at the forward end of the frame 12. Cables 125 and 126 are broken away in FIGURE 1. The pedals are mounted for oscillation on a fixed spindle 132 attached to frame 12 at floor level for the convenience of the pilot. The cables, of course, following ordinary techniques, are reeved over pulleys as required.

The elevator 122 is mounted on a transverse spindle or shaft 138 carried in bearings 140 (FIGURE 7) at the after part of frame 12. Two arms 142 and 144 protrude laterally from shaft 138, and these have cables 146 and 148 fixed thereto and reeved under pulleys 150 and 152 carried by frame 12. The cables extend forwardly to lever 156 which is mounted on a pivot 160 carried by torque tube 162 that extends in a front to rear direction of frame 12. Upon pivotal movement of lever 156, cables 146 and 148 are alternately paid in or out, thereby causing the elevator to be pivotally adjusted.

The empennage ailerons 123 operate in unison, but the direction of deflection is alternate. The ailerons 123 are in a pair including aileron members 170 and 171, each being mounted for oscillation on shaft 172 that is fixed to the frame 12. Torque tube 162 is mounted for oscillation in bearings 174 and 175, attached to frame 12, and there are laterally projecting arms 176 and 177 at the rear end thereof (FIGURES 1 and 7) to which crossed cables or rods 180 and 182 are secured. It is now quite evident that lateral deflection, i.e., left and right, of lever 156 will cause a corresponding adjustment of the aileron members 170 and 171.

The operation of the rotor has been discussed previously. In operation of the control surfaces of empennage 120, lateral control of the aircraft is achieved by operating the rudder 121. Pitch and pitch control is obtained by adjusting the elevator 122. Roll is achieved and controlled by adjusting the ailerons 123. At low speeds and at high speeds, the air stream from propeller 114 provides sufficient aerodynamic control forces on all of the control surfaces of the empennage. This control is in addition to or takes the place of control of the helicopter achieved by adjustment of the blades of the rotor.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A helicopter aircraft having a frame, a main rotor carried by said frame and adapted to be rotated on a generally vertical axis, an empennage connected to the rear of said frame, said empennage including a rudder adapted to control the aircraft about its yaw axis, an elevator adapted to control the pitch of the aircraft and ailerons adapted to control roll of the aircraft about its longitudinal axis, control means for said rudder and connected therewith, control means for said elevator connected with the elevator, and control means for the ailerons connected with the ailerons, a propulsion propeller, means carried by said frame for rotating said propulsion propeller, and said propulsion propeller located adjacent to said empennage to provide an air stream over the empennage whereby aerodynamic forces sufficient to control the roll, pitch and yaw of the helicopter exist, said rotor having blade means, a shaft assembly including a first shaft and a second shaft concentric therewith, said blade means connected drivingly with said second shaft, and means connected with said first shaft and said blade means for adjusting the angularity thereof during the rotation of the rotor.

2. The aircraft of claim 1 wherein the last-mentioned means includes an inertia bar having weights on its outer ends, links connected pivotally with said inertia bar inwardly of said weights and said blades.

3. The aircraft of claim 1 wherein the last-mentioned means includes an inertia bar having weights on its outer ends, links connected pivotally with said inertia bar inwardly of said weights and said blades, and means for axially adjusting said first shaft, said inertia bar pivoted intermediate its ends to said first shaft whereby upon axial adjustment of said first shaft the angular deflection of said blades is adjustable, said last named means including a control linkage movably mounted on said frame, a thrust bearing connecting the linkage to a lower end of said first shaft.

4. The aircraft of claim 1 wherein said ailerons comprise two control surfaces pivotally mounted on axes generally normal to the longitudinal roll axis of the aircraft, said control surfaces mounted on opposite sides of the frame, the aileron control means being connected to said ailerons so as to oscillate them on their axes in opposite directions from a coplanar position.

5. The aircraft as defined in claim 1 wherein said elevators are movably mounted directly behind said ailerons and are simultaneously oscillated by their control means in the same direction on axes parallel to the axes of the ailerons.

6. A helicopter aircraft comprising, an air frame means, powered rotor means rotatably mounted by said air frame means, a pair of airfoil means independently rotatably mounted on said rotor means on a blade axis disposed perpendicular to a rotational axis of the rotor means, linkage means rotatable with said rotor means and operatively interconnecting said pair of airfoil means to restrict both airfoil means to equal angular displacement about the blade axis in the same direction, said linkage means including a bar generally parallel to said blade axis and pivotally mounted at its center on pivot means having an axis perpendicular to said blade and rotational axes, weight means connected to the ends of said bar and rotatable therewith tending to stabilize and equalize the adjusted angular positions of said pair of airfoil means relative to the blade axis in response to rotation of the rotor means, and airfoil pitch control means operatively connected to said bar by said pivot means and rotatable with said rotor means for simultaneously varying the adjusted angular positions of the pair of airfoil means relative to the blade axis, by equal amounts and in opposite directions.

7. The combination as defined in claim 6, wherein said linkage means includes adjustable link means for independently varying the angular positions of the airfoil means relative to each other and to said frame means.

8. The combination as defined in claim 6, wherein said pitch control means comprises a control shaft rotatable and coaxial with said rotor means and axially movable relative thereto for adjusting the position of the linkage means and airfoil means relative to the frame means.

9. The combination as defined in claim 6, wherein said linkage means comprises a pair of link members pivotally connected to the central portion of said rod on either side of the control shaft, the link members being also respectively connected to said airfoil means.

References Cited in the file of this patent
UNITED STATES PATENTS

| | | |
|---|---|---|
| 1,857,807 | Cierva | May 10, 1932 |
| 2,037,745 | Vaughn | Apr. 21, 1936 |
| 2,429,502 | Young | Oct. 21, 1947 |
| 2,547,255 | Bruel | Apr. 3, 1951 |
| 2,664,958 | Dancik | Jan. 5, 1954 |